United States Patent [19]

Rich

[11] 3,881,098

[45] Apr. 29, 1975

[54] PHOTOEXPOSURE SYSTEM

[75] Inventor: Leonard G. Rich, West Hartford, Conn.

[73] Assignee: The Gerber Scientific Instrument Company, South Windsor, Conn.

[22] Filed: July 5, 1973

[21] Appl. No.: 376,918

[52] U.S. Cl. ........................ 235/151; 95/1.1; 355/5; 355/20

[51] Int. Cl. ........................ G06f 15/20; G03b 29/00

[58] Field of Search ............... 235/151; 95/1 A, 1.1; 355/5, 14, 20; 178/6.8, 7.4, 7.8

[56] References Cited

UNITED STATES PATENTS

| | | | |
|---|---|---|---|
| 3,273,476 | 9/1966 | Haynes | 178/7.4 X |
| 3,527,978 | 9/1970 | Harrison | 178/7.4 X |
| 3,537,788 | 11/1970 | Young | 355/20 X |
| 3,555,177 | 1/1971 | Tyler | 178/7.4 X |
| 3,587,418 | 6/1971 | Nielsen | 95/1.1 |
| 3,673,936 | 7/1972 | Stone, Jr. et al. | 355/5 X |
| 3,763,365 | 10/1973 | Seitz | 235/151 X |

*Primary Examiner*—Malcolm A. Morrison
*Assistant Examiner*—Jerry Smith
*Attorney, Agent, or Firm*—McCormick, Paulding & Huber

[57] ABSTRACT

A system for exposing artworks on a photosensitive surface includes a photoexposure device having a cathode ray tube energized to exhibit luminous symbols, one at a time, on its face. An associated optical system projects a real image of the luminous exhibited symbol onto a sheet of photosensitive material. Symbol generating signals supplied to the cathode ray tube are derived from a store wherein they are defined in relation to a single fixed or standard angular orientation relative to the face of the cathode ray tube. As electronic resolver modifies the symbol defining signals supplied from the symbol store to produce "rotated" symbol generating signals which are supplied to the cathode ray tube and which cause the illumination on the face of the cathode ray tube of corresponding luminous symbols at selected angular orientations corresponding to angular orientation commands supplied to the electronic resolver. The symbol store may be a memory unit associated with a computer and in which memory unit the symbol defining signals are stores as sets of digital instructions, or it may consist of a set or font of predrawn graphic symbols and an associated camera tube or similar sensor for raster scanning individually selected ones of such predrawn symbols. By a two-dimensionally movable carriage supporting the cathode ray tube, the tube is movable relative to the photosensitive surface to allow the symbols illuminated on its face to be exposed at any desired location on the photosensitive surface. To expose a line on the photosensitive surface the cathode ray tube is energized to repetitively illuminate straight line strokes on its face while the image location of such strokes is moved along the desired line to be exposed. As part of the line exposing process, a signal corresponding to the instantaneous slope or tangent of the line being exposed is derived and supplied to the resolver to cause each stroke illuminated on the face of the cathode ray tube to be so angularly oriented that its image on the photosensitive surface is perpendicular to the line being exposed.

16 Claims, 10 Drawing Figures

PHOTOEXPOSURE SYSTEM

BACKGROUND OF THE INVENTION

This invention relates to photoexposure systems for generating artworks on a photosensitive surface by consecutively exposing symbols and/or lines on such surface, and deals more particularly with such a system wherein an electronic resolver is used to vary the orientation of the exposed symbols relative to the photosensitive surface.

Photoexposure systems of the type with which this invention is concerned usually include a computer or other numerical controller which controls a photoexposure device to cause it to generate an artwork on a photosensitive surface by exposing, one after the other, a number of symbols and/or lines on such photosensitive surface. One application in which such photoexposure systems are well known is the manufacture of integrated circuit components wherein the artwork may be, after proper development, a master transparency or mask representing a portion or all of an integrated circuit diagram. Another exemplary area of use is the field of cartography wherein the system may be used to expose maps on a photosensitive surface.

Commonly, the symbols exposed on the photosensitive surface consist of alphabetical or numerical characters or shapes, such as legend symbols or circuit pads, having particular application to the type of artwork being generated. In some cases, such as in the photocomposition of a page of printed text, all of the symbols exposed on the photosensitive surface may have a fixed angular orientation relative thereto. However, in many other cases it is desired to have symbols appear at various different angular orientations on the photosensitive surface and, accordingly, some means need to be provided to allow for this. One of the objects of this invention, therefore, is to provide a photoexposure system capable of exposing symbols at any desired angular orientation relative to the photosensitive surface being worked on, and particularly wherein such variation in the orientation of the exposed symbols is enabled without the necessity of storing each symbol in a large number of different forms, each of which forms represents the symbol in a slightly different angular orientation. In the system of this invention a cathode ray tube is used as the light source. When exposing symbols on the associated photosensitive surface the desired symbols are generated on the face of the tube by controlling its beam in either a stroke writing manner or in a raster writing manner. In either case an electronic resolver is used to modify the symbol generating signals to rotate the generated symbol to a desired angular orientation.

In the past, it has been known to expose lines on a photosensitive surface by producing a beam of light which is shaped and directed onto the photosensitive surface to form a light spot of circular or other simple geometry which is moved over the photosensitive surface along the desired line to be exposed. When using a cathode ray tube as a source of light, it is difficult to obtain a properly illuminated and sharply defined light spot for use in line drawing. In the present device, this problem is overcome and the drawing of lines is achieved by repetitively tracing a straight line stroke on the face of the cathode ray tube and moving the image location of such stroke along the desired line to be exposed while maintaining the image oriented perpendicular to its path of travel. The length of the repetitive strokes determines the width of the exposed line and the intensity of the cathode ray beam is controlled with respect to the velocity of the image location along its path of travel to produce the proper exposure of the photosensitive surface. This method of exposing lines has the advantage that it is unnecessary to vary the intensity of the beam with changes in the line width; and since the exposure of the line across its width is uniform, there is no "burning" or other adverse effect such as usually associated with lines drawn by circular light spots.

In the system of this invention, the rotation of the symbols, since it is performed electronically, is almost instantaneous and, therefore, the throughput of the device is extremely great, particularly as compared to devices wherein symbol rotation is achieved by mechanical means such as rotating prisms or mirrors. Also, in the system of this invention, the symbols may be generated on the face of the cathode ray tube with varying amounts of X and Y offset from a fundamental position on the tube face. Therefore, once the tube or its face image is stopped relative to the photosensitive surface, it can be commanded to expose a number of symbols, each having different offset values, onto the photosensitive surface before moving to its next position, and this further increases the throughput of the device. A scaling means is also preferably included in the system for causing the selected symbols to appear on the face of the cathode ray tube at various selected scales or sizes. For pads or other symbols which are desired to be exposed in an entirely filled-in manner, the scale means may be controlled to vary the scale between a desired maximum value and a minimum value as the symbol shape is repetitively traced on the face of the cathode ray tube, thereby exposing a filled-in area with excellent edge definition.

Accuracy relative to the photosensitive surface is enhanced in the system of this invention by utilizing a lens in the photoexposure device which causes the real image projected onto the photosensitive surface to be a demagnified version of the symbol illuminated on the face of the cathode ray tube. Therefore, the image reduction of the lens reduces the absolute error of the cathode ray tube in direct proportion to the demagnification of the optical system. Interchangeable lenses or a zoom lens may be utilized in the device to interchange accuracy for area coverage as desired.

The embodiment of this invention utilizing a store of predrawn graphic symbols and a raster scanning sensory device for producing the symbol defining signals supplied to the cathode ray tube is of particular advantage in cases where the symbols are relatively complex type fonts, pad configurations or the like. In such cases, this raster scanning method of symbol generation avoids the storage of tremendous amounts of data in a computer memory and also provides for high throughput since regardless of the complexity of the symbols the time to write or expose any selected symbol is always a constant.

SUMMARY OF THE INVENTION

This invention resides in a photoexposure system for generating an artwork on a photosensitive surface by consecutively exposing a number of symbols and/or lines thereon. The device utilizes a cathode ray tube as the light source. A symbol signal generator provides signals commanding the excitation of the cathode ray tube in such a manner as to cause the illumination on its face of symbols all having a given angular orientation relative to the face. To allow for exposure of symbols on the photosensitive surface at different angular orientations, the system includes an electronic resolver between the symbol signal generator and the cathode ray tube for modifying the symbol defining signals from the signal generator, in response to an angular orientation signal, to produce modified signals which are applied to the cathode ray tube and which cause the illumination on its face of symbols at varying desired angular orientations relative to its face. The symbol signal generator may be part of a computer having an associated memory or storage unit wherein the symbols are stored as digital instructions instructing movement of the cathode ray tube beam in stroke writing fashion, the symbol defining signals produced thereby being a set of time varying digital signals directly related to the X and Y deflection of the cathode ray tube beam. Alternatively, the symbol signal generator may consist of a graphic display of predrawn symbols selectively scanable in raster fashion by an associated vidicon, image orthicon or other raster scanning optical sensor. In this case, the beam of the cathode ray tube is deflected to raster scan in unison with the scanning movement of the beam of the scanning optical sensor and its entire raster scanning field is rotated, by modifying its X and Y deflection inputs, by an electronic resolver to rotate the image of the symbols.

To expose a line on a photosensitive surface with the system of this invention the symbol signal generator provides information to the cathode ray tube causing it to repeatedly illuminate a straight line stroke on its face, and the angular orientation of the stroke relative to the face of the cathode ray tube is controlled by an angular orientation signal related to the instantaneous slope of the line being exposed so that the image of the stroke, as it appears on the photosensitive surface, remains oriented perpendicular to the line being exposed. The invention also resides in the system including a scaling means for controlling the scale of the symbols exposed on the photosensitive surface and to the exposure of completely filled-in symbols by modulating the scaling means to cause a selected symbol to be repeatedly traced on the face of the cathode ray tube at a varying scale.

DESCRIPTION OF THE PREFERRED EMBODIMENTS

Figure 1:
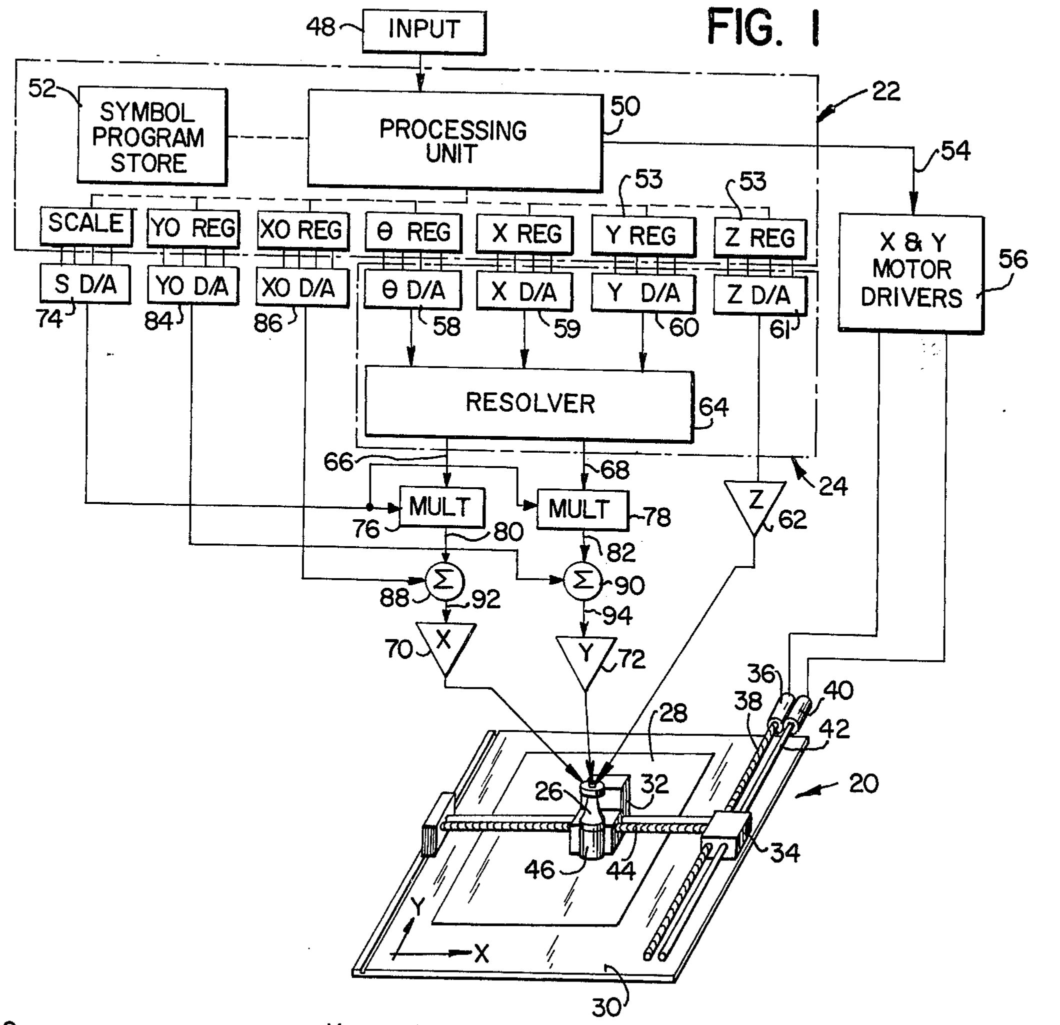
FIG. 1 is a schematic diagram illustrating a system comprising one embodiment of this invention.

Turning to FIG. 1, the photoexposure system there illustrated comprises basically a photoexposure device 20, a computer 22, and an electronic resolver 24. The photoexposure device 20 includes a cathode ray tube 26 having a face on which luminous symbols are produced by the movement of its beam, and real images of such luminous symbols are projected onto a sheet 28 of photosensitive material to generate an artwork thereon. The image projected onto the photosensitive sheet 28 is movable in any direction in the plane of the sheet to allow any desired area of the sheet to be exposed. Within the broader aspects of this invention, various different means may be used to obtain such relative movement between the projected image and the photosensitive sheet. In the illustrated case, however, the device 20 includes a table 30 having a flat upwardly facing surface for supporting the sheet, and relative movement between the projected image and the sheet is obtained by mounting the cathode ray tube 26 on a work carriage 32 movable in both the illustrated X and Y coordinate directions in a plane parallel to and above the plane of the sheet. The work carriage 32 is supported by a main carriage 34 which straddles the table 30 and which is moved in the Y coordinate direction by a motor 36 and associated lead screw 38. The work carriage 32 is movable in the illustrated Y coordinate direction relative to the main carriage 34 and is driven in such movement by a motor 40, spline shaft 42 and lead screw 44.

The fact of the cathode ray tube 26 may be located very close to the surface of the photosensitive sheet 28 so that the symbol illuminated on its face is projected directly onto the photosensitive material in the manner of contact printing. Preferably, however, the device 20 includes a lens or lens system 46 between the cathode ray tube face and the photosensitive material 28 to cause a real image of the illuminated symbol to be projected onto the photosensitive material. Preferably, the lens or lens system 46 is such as to cause the projected real image to be a demagnified version of the symbol illuminated on the cathode ray tube face. If desired, the lens or lens system 46 may be a zoom lens which is adjustable to vary the demagnification ratio, or it may be constructed so as to allow the substitution of different lenses to likewise selectively vary the demagnification ratio.

The computer 22 controls the operation of the photoexposure device 20 in response to input signals provided by an input device 48, such as a magnetic tape or punched paper tape reader, and in accordance with an operating program stored in the computer. The computer 22 includes a central processing unit 50 and an associated memory unit, or portion of a memory unit, referred to as a symbol program store 52. The symbol program store 52 contains a number of sets of digital instructions each of which sets defines a particular symbol. The computer operates to provide a number of digital output signals or words which appear in one or more output registers 53, 53 forming a part thereof. In FIG. 1, the computer 22 is shown to have seven output registers 53, 53 entitled respectively "Scale", "YO Reg", "XO Reg", "$\theta$ Reg", "X Reg", "Y Reg", and "Z Reg." The "Scale" register provides a signal dictating the scale at which the symbol illuminated on the face of the cathode ray tube 26 is to be produced. The YO register and the XO register respectively provide signals representing the Y and X offsets at which the symbol is to be illuminated on the face of the cathode ray tube. The $\theta$ register provides a signal representing the angular orientation at which the symbol is to be illuminated on the face of the cathode ray tube. The X and Y registers provide symbol defining signals commanding deflection of the beam of the cathode ray tube 26 in such a manner as to stroke write the desired symbol on the face of the tube. The Z register provides a signal controlling the intensity of the beam of the cathode ray tube. It, of course, will be understood that these various digital signals need not necessarily be provided by separate output registers as shown, but may appear in different positions of or at different times in a single register or in a lesser number of registers than the illustrated seven registers.

The computer 22 also controls the movement of the work carriage 32 relative to the photosensitive surface. This is illustrated in FIG. 1 by a line 54 which supplies appropriate command signals to X and Y motor drivers, represented at 56, which in turn drive the X and Y motors 36 and 40.

The sets of digital instructions stored in the symbol program store 52 of FIG. 1 define the associated symbols in terms of a fixed orientation of such symbols relative to the face of the cathode ray tube 26. The computer output signals which define a selected symbol are referred to herein as "symbol defining" signals and are the X register, Y register and Z register words. The signals which are applied to the cathode ray tube to cause it to generate a selected symbol are referred to herein as "symbol generating" signals. If the symbol defining words are converted directly, without rotation or offset modification as hereinafter described, into "symbol generating" signals for driving the cathode ray tube 26, they cause the illumination on the face of the cathode ray tube of the corresponding symbol at a given fixed angular orientation and at a given location on the face.

In many applications it is desirable to expose symbols on a photosensitive material at angular orientations other than a standard fixed orientation. In the system of FIG. 1 a resolving means 24 is utilized to convert the symbol defining signals into modified symbol generating signals which modified symbol signals, when applied to the cathode ray tube 26, cause the symbol in question to be illuminated on the face of the tube at the desired angle. The construction and operation of the resolving means 24 is discussed in more detail below; however, for the present, it should be noted that the resolving means 24 has as inputs thereto the set of digital symbol defining signals consisting of the X register word, the Y register word and the Z register word. It also has as an input thereto the "$\theta$" register word which commands the angle at which the selected symbol is to appear on the face of the cathode ray tube. These digital signals are made to appear in the associated registers through the functioning of the computer 22 as a result of the input information supplied to the computer by the input device 48. For example, the input device 48 may supply instructions to the computer 22 instructing the writing of the alphabetical symbol G on the face of the cathode ray tube at a specified angle $\theta$ from a given reference or standard orientation. The digital signals which appear in the X register, Y register and Z register define the symbol G in a standard orientation, and the signal in the $\theta$ register commands the desired orientation. The signals in the X and Y registers are related to deflection of the beam in X and Y coordinate directions and vary with time so as to cause the beam to stroke write the selected symbol on the face of the tube. The Z register word controls the intensity of the beam and during symbol writing is generally such as to command the beam to be in either an "on" or an "off" condition.

The construction of the resolving means 24 may vary without departing from the invention, but in the illustrated case includes four digital to analog converters 58, 59, 60 and 61 for respectively converting the four digital input signals into four analog signals. The output of the converter 61 is supplied directly, through an amplifier 62, to the beam intensity control terminal of the cathode ray tube 26. The outputs of the three other converters 58, 59 and 60 are supplied to a resolver 64 which modifies the X and Y signals from the converters 59 and 60, in response to the $\theta$ signal, from the converter 58 to provide modified X and Y signal generating signals appearing respectively on the output lines 66 and 68 which, if applied respectively to the X and Y deflection terminals of the cathode ray tube 26, cause its beam to be deflected in such a manner as to stroke write the desired symbol on its face at the desired angular orientation relative thereto.

The modified X and Y deflection signals appearing on the resolver output lines 66 and 68 may be applied directly to the X and Y beam deflection terminals of the cathode ray tube 26 through associated driving amplifiers 70 and 72. However, the system, as illustrated in FIG. 1, also preferably includes means for scaling the outputs 66 and 68 to cause the symbol to be written on the face of the tube at a desired scale and for adding X and Y offsets to the signals 66 and 68 to cause the symbol to be written at a desired position on the face of the tube other than a given fixed or standard position. The illustrated scaling means includes a digital to analog converter 74 for converting the scale word appearing in the Scale register of the computer to an analog scale signal supplied to two multipliers 76 and 78 which multiply the output signals appearing on the lines 66 and 68 by the scale signal to produce scaled X and Y deflection signals appearing on the lines 80 and 82. Scaling may, of course, also be achieved by other well-known means, as for example, by digitally multiplying, in the computer, the symbol defining instructions taken from the symbol program store 52 by a desired scale factor before supplying such instructions to the X and Y output registers of the computer.

The X and Y offset providing means of the system illustrated in FIG. 1 consist of a Y offset digital to analog converter 84 and an X offset digital to analog converter 86. These latter converters respectively convert the digital words appearing in the YO and XO registers into analog signals supplied to summing circuits 88 and 90. The summing circuit 88 adds the analog X offset signal to the scaled X signal appearing on the line 80 to define an X deflection signal, appearing on the line 92, applied through the amplifier 70 to the X deflection terminal of the cathode ray tube 26. Likewise, the summing circuit 90 adds the analog Y offset signal from the converter 84 to the scaled Y signal appearing on the line 82 to produce a Y deflection signal, appearing on the line 94, applied to the Y deflection terminal of the cathode ray tube 26 through the driving amplifier 72. Again, it will, of course, be understood that the X and Y offset may be introduced in other ways as, for example, digitally adding, in the computer, X and Y offset signals to the symbol defining instructions extracted from the symbol store 72 before such instructions reach the X and Y output registers of the computer.

Figure 2:
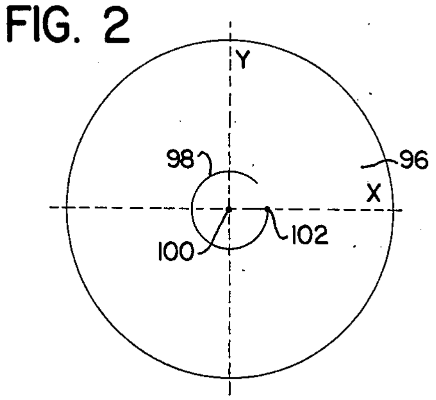
FIG. 2 is a view showing the face of the cathode ray tube of the system of FIG. 1 and showing a symbol illuminated thereon at a given reference angular orientation and at a given reference position.

By way of illustration, FIGS. 2, 3, 4 and 5 show a symbol illuminated on the face of the cathode ray tube 26 of the system of FIG. 1 with and without both rotation from a standard angular orientation and offset from a standard position. In these figures the face of the tube is shown at 96. The illustrated X axis is the axis along which the beam of the tube is deflected by signals applied to its X deflection terminal and the illustrated Y axis is the axis along which the beam is deflected in response to signals applied to its Y deflection terminal. In all four figures the beam of the tube is shown to be deflected to cause the illumination on the face 96 of the alphabetical character G indicated at 98. The angular orientation and position of the symbol 98 are or may be determined by a center point 100 and an index point 102. These points are, however, only reference points and are invisible and unidentified on the face 96. FIG. 2 shows the character 98 illuminated on the face 96 at a standard orientation and at a standard position. In this case, the center point 100 is located at the origin of the X and Y axes and the index mark 102 is so located that the line drawn between it and the center point 100 has a zero angle with the X axis.

Figure 3:
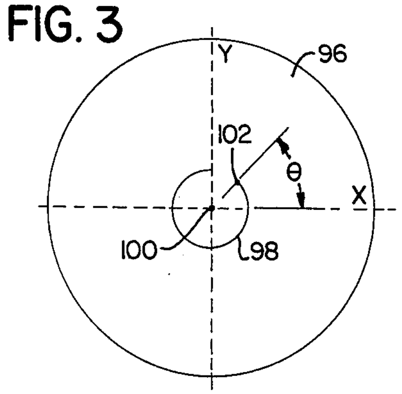
FIG. 3 is similar to FIG. 2 but shows the symbol illuminated thereon rotated by a given angle from its reference angular orientation.
Figure 4:
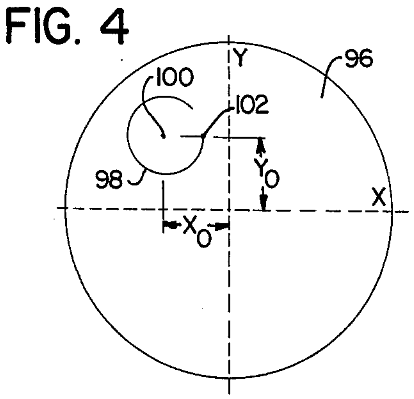
FIG. 4 is a view similar to FIG. 2 but shows the symbol illuminated thereon offset in both the X and Y directions from its reference position.
Figure 5:
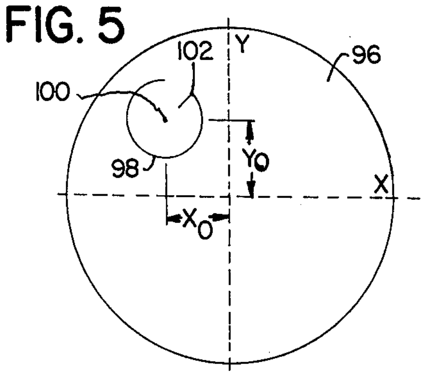
FIG. 5 is similar to FIG. 2 but shows the symbol illuminated thereon both rotated from its reference angular orientation and offset in both the X and Y directions from its reference position.

FIG. 3 shows the symbol 98 at its standard position relative to the face of the tube but rotated from its standard angular orientation by the angle $\theta$. In this case, the center point 100 remains at the origin of the X and Y axes but the character is rotated about such center so that the line drawn between the points 100 and 102 makes the angle $\theta$ with the X axis. FIG. 4 shows the character 98 drawn on the face 96 in such position as to be offset in both the X and Y directions from its standard position, but not rotated. The X offset is the displacement of the center point 100 from the Y axis and is represented by the quantity $X_o$ and the Y offset is the displacement of the center point 100 from the X axis and is represented by the quantity $Y_o$. FIG. 5 shows the character 98 both rotated from its standard angular orientation and offset from its standard position. In FIGS. 2–5 the character 98 has been shown to be of a relatively large size in comparison to the size of the face 96. It will, of course, be understood that symbols of substantially smaller relative size may be generated on the face 96 and when this is done a number of symbols may be generated at different offsets on the face of the tube, so as not to overlap one another, and may be consequently exposed on the surface of the associated photosensitive material without moving the cathode ray tube relative to the photosensitive material.

In the system of FIG. 1, the electron beam of the cathode ray tube 26 is deflected so as to stroke write the desired symbols on its face. That is, the beam is moved over a path describing the desired symbol and writes on the tube face in a manner generally similar to the way in which the symbol would normally be written by pencil or pen on a sheet of paper. To achieve this the signals supplied to the X and Y deflection terminals vary with time. Each point along the strokes defining the symbol is representable by a pair of X and Y coordinates taken with respect to a pair of X and y coordinate axes. With this in mind, the manner in which the resolver 64 operates to convert a set of deflection signals defining an unrotated symbol into a set of modified deflection signals defining a rotated symbol may be considered in connection with FIG. 6.

Figure 6:
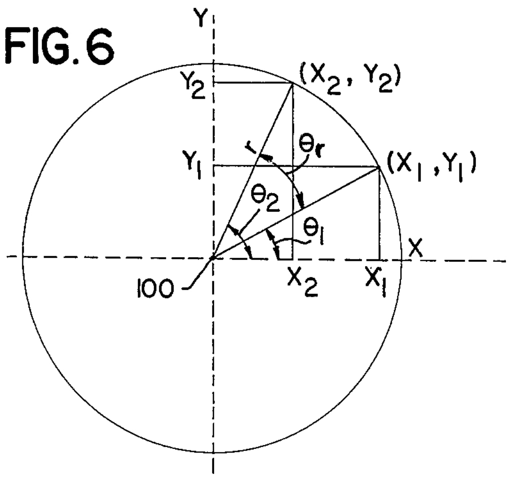
FIG. 6 is a diagram illustrating various quantities used in the mathematical expressions developed herein concerning the transformation of signals representing unrotated symbols to signals representing rotated symbols.

In FIG. 6, the point $(x_1, y_1)$ is a point in an unrotated symbol. The point $(x_2, y_2)$ is the same point in the same symbol after such symbol is rotated from its standard position by the angle $\theta_r$ about its center point 100. The angle $\theta_1$ is the angle, relative to the X axis, of the line drawn between the center point 100 and the point in question prior to rotation, and the angle $\theta_2$ is the angle made by the same line relative to the X axis after rotation. The quantity $r$ is the length of the line from the center point 100 to the point in question. Therefore, $$x_1 = r \cos \theta_1 \qquad \text{(Eq. 1)}$$
$$y_1 = r \sin \theta_1 \qquad \text{(Eq. 2)}$$
$$x_2 = r \cos \theta_2 \qquad \text{(Eq. 3)}$$
$$y_2 = r \sin \theta_2 \qquad \text{(Eq. 4)}$$
$$\theta_2 = \theta_1 + \theta_r \qquad \text{(Eq. 5)}$$

As a trigonometric identity, it is known that:

$$\sin(a + b) = \sin a \cos b + \cos a \sin b \qquad \text{(Eq. 6)}$$
$$\cos(a + b) = \cos a \cos b - \sin a \sin b \qquad \text{(Eq. 7)}$$

Substituting Eq. 5 in Eq. 3 we have:

$$x_2 = r \cos (\theta_1 + \theta_r) \qquad \text{(Eq. 8)}$$

Using the identity of Eq. 7, Eq. 8 therefore becomes:

$$x_2 = r(\cos \theta_1 \cos \theta_r - \sin \theta_1 \sin \theta_r) \qquad \text{(Eq. 9)}$$

But by substituting Eqs. 1 and 2 in Eq. 9, Eq. 9 is reduced to:

$$x_2 = x_1 \cos \theta_r - y_1 \sin \theta_r \qquad \text{(Eq. 10)}$$

By a similar process and using the identity of Eq. 6, Eq. 3 may be transformed to:

$$y_2 = y_1 \cos \theta_r + x_1 \sin \theta_r \qquad \text{(Eq. 11)}$$

From Eqs. 10 and 11, it will therefore be noted that the rotated coordinates $(x_2, y_2)$ of any point in a figure illuminated on the face of the cathode ray tube may be obtained by appropriate sine and cosine programming of the unrotated coordinates of such point.

Figure 7:
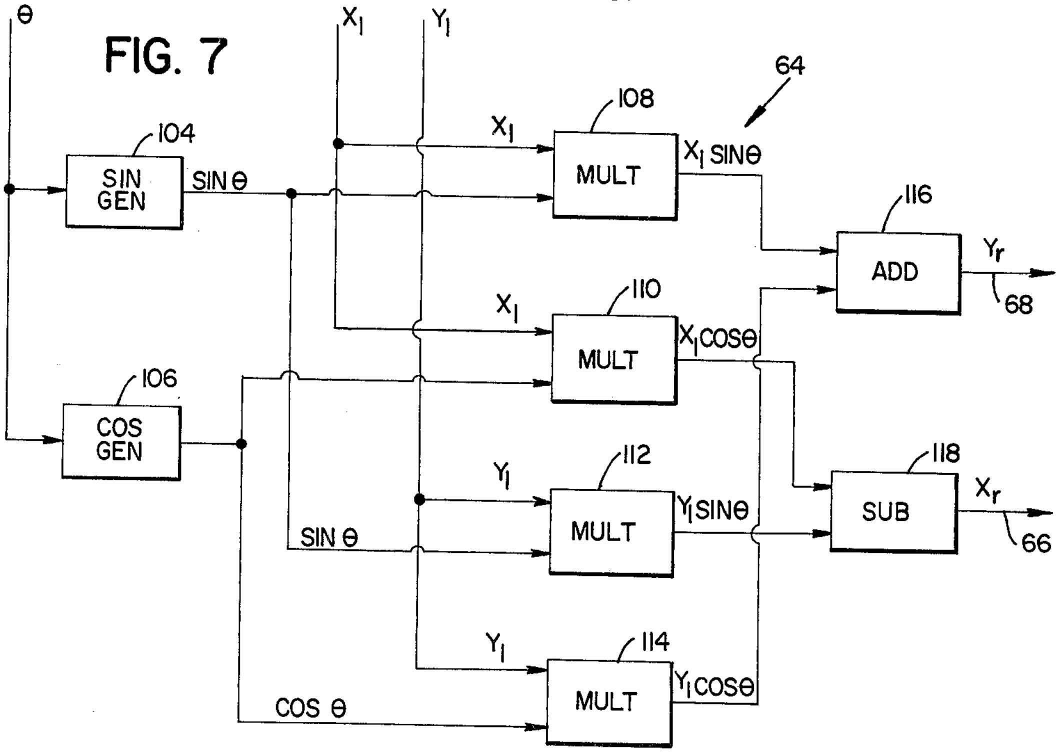
FIG. 7 is a block diagram illustrating the construction of the electronic resolver of FIG. 1.

The sine and cosine programming required by Eqs. 10 and 11 to transform unrotated coordinate signals to rotated coordinate signals is the function provided by the resolver 64 of FIG. 1. The particular manner in which the resolver accomplishes this programming may vary, but an exemplary construction of the resolver is shown by way of example in FIG. 7. Referring to FIG. 7, the resolver 64 as there shown comprises a sine generator 104 and a cosine generator 106 both having as inputs thereto the analog $\theta$ signal supplied by the digital to analog converter 58. That is, the voltage supplied by the converter 58 is one directly related to the angle $\theta$ by which the symbol to be displayed on the face of the tube is to be rotated from its standard position. The sine generator 104 provides an output directly related to the value sin $\theta$ and likewise the cosine generator 106 produces a value related to cos $\theta$. Four multipliers 108, 110, 112 and 114 are included in the resolver. The multiplier 108 multiplies the input signal $x_1$, from the digital to analog converter 59, with the value sin $\theta$ to produce an output signal having the value $x_1$ sin $\theta$. The multiplier 110 multiplies the input signal $x_1$ with the cos $\theta$ signal to produce an output signal having the value $x_1$ cos $\theta$. The multiplier 112 multiplies the input signal $y_1$, from the digital to analog converter 60, with the value sin $\theta$ to produce an output signal having the quantity $y_1$ sin $\theta$, and the multiplier 114 multiplies the input signal $y_1$ with the signal cos $\theta$ to produce an output signl having a value representing the quantity $y_1$ sin $\theta$. Finally, an adder 116 adds the signals $x_1$ sin $\theta$ and $y_1$ cos $\theta$ to produce an output signal $Y_r$, and a subtracter 118 subtracts the signal $y_1$ sin $\theta$ from the signal $x_1$ cos $\theta$ to produce an output signal $X_r$. The signals $X_r$ and $Y_r$ are those which appear on the lines 66 and 68 of FIG. 1. From the foregoing, it will therefore be understood that as time varying digital signals appear in the X and Y registers of the computer, the resolving means 24, which includes the resolver 64 and digital to analog converters 58, 59 and 60, converts such signals to the signals $X_r$ and $Y_r$ which, if applied directly to the cathode ray tube, cause the signal defined by the X and Y register words to be written on the face thereof at an angular orientation dictated by the $\theta$ word in the $\theta$ register. Therefore, rotation of the symbols is obtained by purely electronic means without the need for any mechanical rotating apparatus. Also, it will be understood that the illustrated resolving means 24 is exemplary only and other constructions of such means may be employed if desired. For example, the sine and cosine programming performed by the resolver 64 may be executed digitally in the computer to provide "rotated" digital X and Y output words which are then merely directly converted to analog signals for application to the X and Y deflection terminals of the cathode ray tube.

Figure 8:
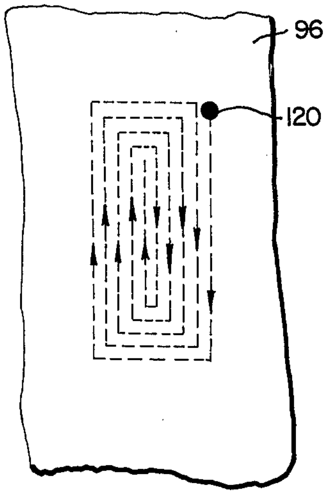
FIG. 8 is a partial fragmentary view of a portion of the photosensitive surface being exposed and illustrates the path of movement of the projected image of the luminous spot produced on the face of the cathode ray tube by its beam when exposing a filled-in symbol on the photosensitive surface.

Some of the symbols stored in the program store 52 of FIG. 1 may be symbols such as rectangular shapes, printed circuit pads and the like which are to be exposed on the photosensitive material in a completely filled-in manner. The system of FIG. 1 allows for such filling in in a simple and expeditious way by gradually varying the scale factor as the beam of the cathode ray tube repeatedly traces the outline of the selected symbol. For example, referring to FIG. 8, the broken lines of this figure show the path of the electron beam 120 as it traces a rectangular shape which is to be exposed on the photosensitive material in a completely filled-in manner. The symbol stored in the symbol program store 52 is that of a rectangle. After the data describing this symbol is extracted from the symbol store it is supplied a number of times to the X and Y registers of the computer to cause the beam 120 to execute the shape a similar number of times. The first time the shape is executed the scale, as determined by the number set into the Scale register, is such as to draw the symbol to the desired outside dimension. As the beam subsequently repeats the shape the scale is diminished gradually until the scale reaches a zero or minimum value at which the beam has traversed the entire area enclosed by the initial execution of the shape at maximum size. Of course, the path of the beam may be opposite from that shown in FIG. 8 with the scale starting at a zero or minimum value and gradually increasing to the maximum value.

Figure 9:
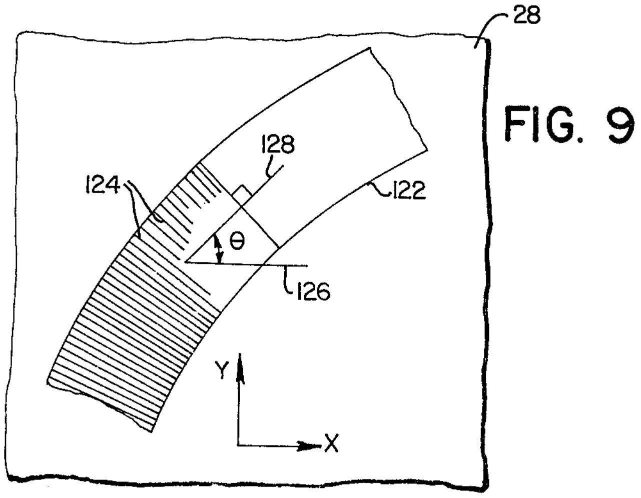
FIG. 9 is a fragmentary view illustrating a portion of the photosensitive surface being exposed and showing the path of movement of the image of the luminous spot produced on the face of the cathode ray tube by its beam when exposing a line on the photosensitive surface.

In addition to being used to expose predefined symbols on the photosensitive surface 28, the apparatus of FIG. 1 may also be used to expose lines thereon by moving the cathode ray tube 26 relative to the photosensitive material 28 while its electron beam is energized to illuminate a portion of its face. This line drawing function is achieved by causing, through the computer 22, the beam of the cathode ray tube to repeatedly illuminate a straight line stroke on the face of the tube. Referring to FIG. 9, this figure shows a portion of the photosensitive surface 28 on which a line 122 is to be exposed by such a repetitive stroke drawing process. The lines 124, 124 are the strokes drawn by the beam of the cathode ray tube as reflected onto the photosensitive surface 28. The length of the repeated strokes 124, 124 determines the width of the line 122. The strokes 124, 124 are produced as a result of stroke defining instructions taken from the symbol store 52 of the computer of FIG. 1 and supplied to the X and Y registers. These instructions if converted without rotation modification to deflection signals for the cathode ray tube would cause strokes to appear on the face of the cathode ray tube in a fixed vertical orientation as reflected to the photosensitive surface 28 in FIG. 9. However, as the cathode ray tube is moved relative to the photosensitive surface 28 along the line 122, the computer 22 determines, from the data supplied thereto, the instantaneous slope of the line 122. Such slope is the angle $\theta$ shown in FIG. 9 and may be referred to as a tangent signal as it is the angle between a line 126 parallel to the X axis and a line 128 tangent to the line 122. This tangent signal, in the system of FIG. 1, is supplied to the "$\theta$" register of the computer and, accordingly, used by the resolving means 24 to rotate the stroke defining signals supplied thereto from the computer to rotated deflection signals which cause the strokes 124, 124 shown in FIG. 9 to be so angularly oriented that each occurs generally perpendicular to its associated tangent line.

Also, the intensity of the beam of the cathode ray tube 26 is controlled during the line drawing process so that the intensity is varied in accordance with the velocity of the cathode ray tube along the line, such as the line 122 of FIG. 9, being exposed. This is accomplished by the computer 22 computing the velocity of the cathode ray tube 26 relative to the photosensitive surface 28 and by supplying a signal to the Z register corresponding to the velocity so that the intensity of the beam increases as the velocity of the cathode ray tube 26 relative to the photosensitive surface 28 increases and vice versa. This assumes, as is preferably the case, that the strokes illuminated on the face of the cathode ray tube occur at a constant repetition rate regardless of the speed of the cathode ray tube relative to the photosensitive surface so that the strokes as exposed on the photosensitive surface 28 occur at a closer spacing to one another when the speed of the cathode ray tube relative to the photosensitive surface is relatively low than they do when the speed of the cathode ray tube relative to the photosensitive surface is relatively higher. However, as the beam is deflected to create any one of the strokes 124, 124 its intensity remains substantially uniform. Therefore, the line 122 is uniformly exposed across its width by the strokes 124, 124 and there is no necessity to vary intensity of the beam with changes in the width of the line 122 being exposed as is the case when a line is exposed on a photosensitive surface by a moving round spot of light.

In the system of FIG. 1, the symbols capable of being reproduced on the photosensitive surface 28 are stored as digital instructions in the symbol program store 52 forming part of the computer 22, and the digital instructions are consonant with the symbols being stroke written on the face of the associated cathode ray tube. Such digital storage and stroke writing of the symbols is not, however, necessary to the broader aspects of the invention and, if desired. the symbol signal rotating aspects of this invention may be applied as well to a system wherein symbols are stored in the form of predrawn graphic elements which are selectively raster scanned by a camera tube or other sensing device to produce signals used to raster deflect and control the intensity of the beam of the cathode ray tube of a photoexposure device in such a manner as to cause the selected symbol to be illuminated on the face of the tube. Such a system is shown by way of example in FIG. 10.

Figure 10:
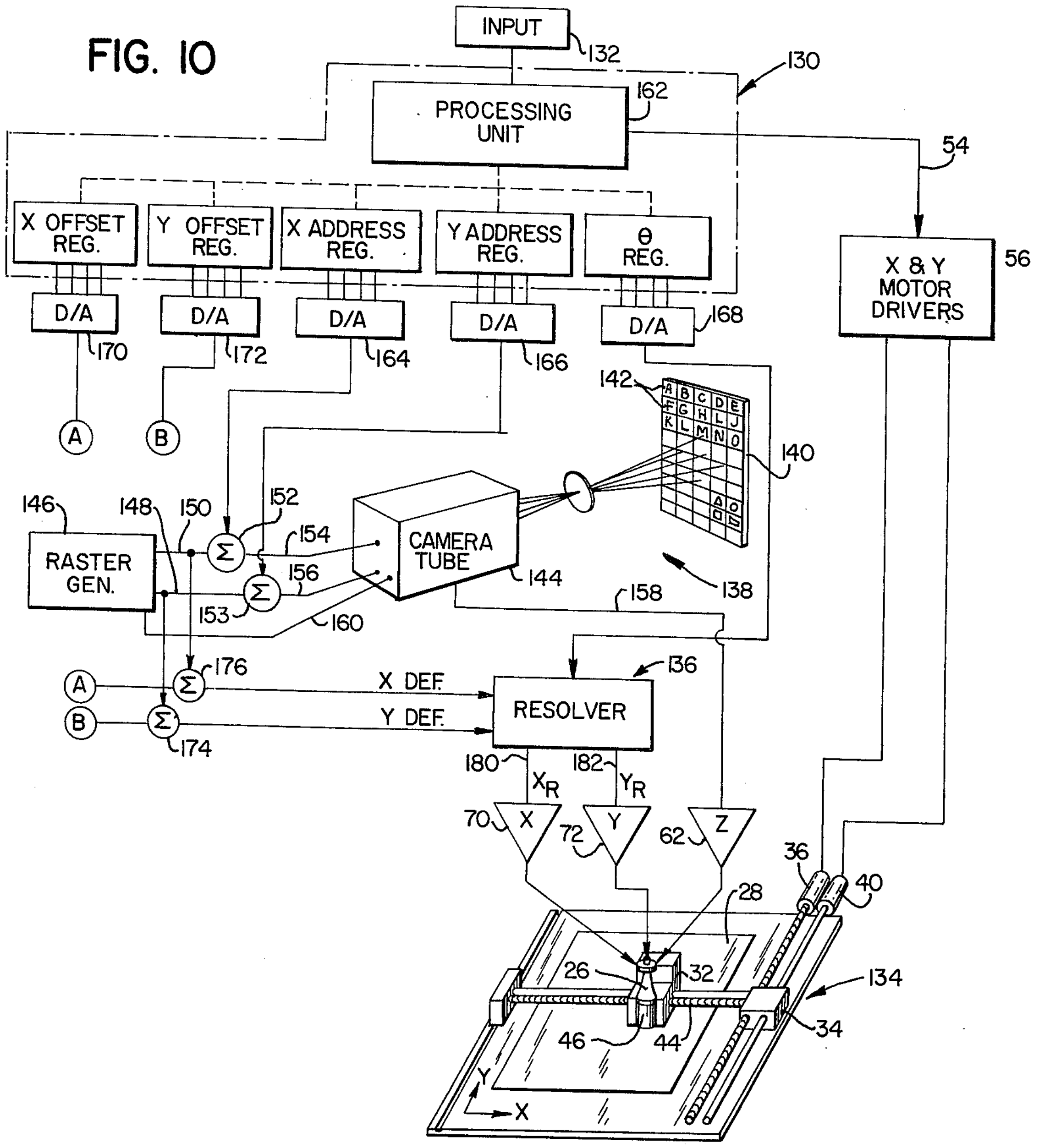
FIG. 10 is a schematic diagram illustrating a system comprising another embodiment of this invention.

Referring to FIG. 10, the system illustrated thereby comprises a computer 130 with an associated input device 132, a photoexposure device 134, a resolver 136 and a symbol signal generating means 138. The photoexposure device 134 is similar to the photoexposure device 20 of FIG. 1, and the same reference numerals as used in FIG. 1 to identify parts of the photoexposure device 20 have been used to identify corresponding parts of the photoexposure device 134 of FIG. 10. The device 134, therefore, need not further be described. Likewise, the resolver 136 is or may be similar to the resolver 64 of FIG. 1 and need not further be described.

The symbol signal generator 138 comprises a graphic display 140 having a plurality of graphic symbols 142, 142 drawn or otherwise formed thereon and arranged, as in rows and columns, so that each appears at a unique addressable location. A camera tube 144, such as a vidicon or image orthicon, is arranged to view the display 140. A raster and blanking generator 146 produces X and Y sweep signals on the lines 148 and 150 which are applied to the X and Y deflection terminals of the camera tube 144 and which are of such character as to cause the camera tube to raster scan a small area of the display 140 equivalent to the area allocated to each of the symbols 142, 142. The X and Y vertical sweep signals supplied by the raster generator 146 are transmitted to the camera tube through summing circuits 152 and 153, respectively, which adds to such signals X and Y address signals, in the nature of X and Y offsets, identifying the location on the display 140 of the desired symbol and causing the production on output lines 154 and 156 of modified deflection signals which cause the beam to be deflected so as to raster scan the area of the graphic display 140 containing the selected symbol.

The camera tube 144 produces an output signal on the line 158 related to the reflectivity of the discrete area instantly under investigation by the beam of the camera tube. The operation of the camera tube 144 and the associated components may be such that in producing signals representing one selected symbol the equivalent symbol on the display 140 is raster scanned for either one or more raster frames. In cases where the symbol is scanned for more than one frame during each symbol writing sequence, the generator 146 may also supply a blanking signal to the camera tube 144 on the line 160 to produce a blank signal on the output line 158 as the beam of the camera tube is returned from the end of one raster field to the beginning of the next raster field.

The operation of the system shown in FIG. 10 may be described as follows. The input device 132 provides information to the computer 130 requiring the exposure on the photosensitive surface 28 of a given selected symbol at a given location on the surface of the material 28 and at a given angular orientation. The processing unit 162 of the computer provides to an X address register and a Y address register digital information identifying the location or address of the selected symbol on the graphic display 140. This digital information is converted by digital to analog converters 164 and 166 to analog signals supplied to the summing circuits 152 and 154 for addition to the X and Y sweep signals on the lines 148 and 150, as previously explained, to cause the camera tube 144 to raster scan the predrawn graphical representation of the selected symbol on the display 140. At the same time, the processing unit 162 supplies a digital signal to the $\theta$ register representing the desired rotation of the selected symbol from its standard position, and this information is converted by an associated digital to analog converter 168 into an analog signal supplied to the resolver 136. The processing unit 162 also supplies signals to the X and Y motor drivers 56 over the line 54 to cause the motors 36 and 40 to drive the cathode ray tube to or near the desired position on the photosensitive material at which the symbol is to be exposed. If the exposure is to be made as a result of the symbol being illuminated on the face of the tube at some offset from its standard position relative to the face of the tube, the processing unit 162 supplies appropriate digital X and Y offset signals to the illustrated X offset and Y offset registers, and these signals are converted to analog signals by the associated digital to analog converters 170 and 172.

The scanning of the selected symbol on the display 140 does not occur until the cathode ray tube 26 is moved to the required position relative to the photosensitive material 28 and its movement stopped. Thereupon, signals from the raster and blanking generator 146 are supplied to the camera tube 144. At the same time, the X and Y sweep signals appearing on the lines 148 and 150 are supplied to the resolver 136 through summing circuits 174 and 176, which latter circuits respectively add to the X and Y sweep signals the X and Y offset signals from the digital to analog converters 170 and 172.

It will be appreciated that the signals from the summing circuits 174 and 176 applied to the resolver 136 are sweep signals which occur in unison with the sweep signals applied to the camera tube 144 and if applied to the X and Y deflection terminals of the cathode ray tube 26 cause the beam of the cathode ray tube 26 to be raster scanned in a manner analogous to the raster scanning of the beam of the camera tube 144. Accordingly, if while such signals are applied to the cathode ray tube the output signal from the camera tube 144, appearing on the line 158, is applied to the beam intensity control of the cathode ray tube 26, the selected symbol scanned by the camera tube 144 will be illuminated on the face of the cathode ray tube 26 at a standard angular orientation. However, the X and Y deflection signals from the summing networks 174 and 176 are not applied directly to the cathode ray tube 126 but are instead applied to the resolver 136 which modifies such signals in accordance with the tangent signal supplied by the digital to analog converter 168 to produce modified or rotated X and Y symbol generating signals. These latter signals appear on the lines 180 and 182 and cause the scanning lines traced by the beam of the cathode ray tube 26, and accordingly the symbol illuminated on the face of the tube, to be rotated through the angle $\theta$ commanded by the tangent signal. Accordingly, the result is the illumination on the face of the tube 26 of the selected symbol rotated by the desired angular value and projected onto the photosensitive material 28 through the lens system 46.

In addition to exposing symbols onto the photosensitive material 128, the system of FIG. 10 may also be used to draw lines thereon in the same manner as described above in connection with the system of FIG. 1. That is, for line drawing, the system of FIG. 10 may be operated to cause the repetitive illumination of a straight line symbol on the face of the cathode ray tube which symbol is repeated as the cathode ray tube is moved relative to the photosensitive surface to cause the image of such line to move over the photosensitive material 28 along a path defining the line desired to be exposed. Such a straight line symbol is produced by providing on the graphic display 140 a predrawn symbol representing a straight line or a rectangle and by addressing the camera tube to scan such predrawn symbol. When drawing a line on the photosensitive surface, the computer is operated as described in connection with FIG. 1 to produce, in the $\theta$ register, a signal representing the instantaneous value of the slope of the line being exposed so that the image of the luminous line illuminated on the face of the cathode ray tube remains perpendicular to the path of the line being drawn or exposed.

The system of FIG. 10 may also, obviously, include a scaling means for controlling the scale of the projected image. Such scaling means may be similar to that shown and described in FIG. 1, but for the purposes of clarity has been omitted in FIG. 10.

I claim:

1. A photoexposure system for exposing an artwork on a sheet of photosensitive material, said system comprising means for supporting a sheet of photosensitive material, a cathode ray tube having a face on which luminous symbols may be generated, means for moving an image of said face of said cathode ray tube in two dimensions parallel to the plane of said sheet of photosensitive material to permit the luminous symbol generated on said face to expose any selected area of said sheet of photosensitive material, means providing electrical symbol defining signals commanding the generation on said face of a luminous symbol at a fixed angular orientation relative to said face, and electronic means for converting said symbol defining signals to symbol generating signals which symbol generating signals are supplied to said cathode ray tube and which cause said luminous symbol to be generated on said face at a selectively variable angular orientation.

2. A photoexposure system for exposing an artwork on a sheet of photosensitive material as defined in claim 1 further characterized by means providing an angular orientation electrical signal representing the selected angular orientation at which said luminous symbol is to be generated on said face, said electronic means being responsive to said angular orientation signal and operable to convert said symbol defining signals to symbol generating signals which cause said luminous symbol to be generated on said face at the angular orientation dictated by said angular orientation electrical signal.

3. A photoexposure system for exposing an artwork on a sheet of photosensitive material, said system comprising means for supporting a sheet of photosensitive material, a cathode ray tube having a face on which luminous symbols may be generated, means for moving an image of said face of said cathode ray tube in two dimensions parallel to the plane of said sheet of photosensitive material to permit said image to be moved along any desired line on said sheet of photosensitive material, means providing electrical symbol defining signals commanding the repetitive generation on said face of a luminous substantially straight line stroke at a fixed angular orientation relative to said face, means providing a tangent signal related to the slope of said line at the point therealong instantaneously encountered by said image, and means responsive to said tangent signal for converting said symbol defining signals to symbol generating signals which symbol generating signals are supplied to said cathode ray tube and which cause said repetitively generated straight line strokes to be so angularly oriented relative to said face that each such straight line stroke in said image of said face is oriented substantially perpendicular to said line.

4. A photoexposure system for exposing an artwork on a sheet of photosensitive material, said system comprising: means for supporting a sheet of photosensitive material, a cathode ray tube having a face, means for projecting a real image of an object illuminated on said face onto said sheet of photosensitive material, means for moving said image in two dimensions parallel to the plane of said sheet of photosensitive material to permit said image to expose any selected area of said sheet of photosensitive material, a signal generator for providing a set of symbol defining signals which set of symbol defining signals command the excitation of said cathode ray tube in such a manner as to cause the illumination on said face of a symbol having a given angular orientation relative to said face, means providing an angular orientation signal corresponding to a desired angular orientation of said symbol on said face, and a means responsive to said set of symbol defining signals and to said angular orientation signal for converting said set of symbol defining signals into a set of symbol generating signals which set of symbol generating signals when applied to said cathode ray tube cause the illumination on said face of said symbol at said desired angular orientation relative to said face, and means for applying said set of symbol generating signals to said cathode ray tube.

5. A photoexposure system for exposing an artwork on a sheet of photosensitive material as defined in claim 4 further characterized by said signal generator for providing symbol defining signals including a computer having a register means and also having a memory device storing a plurality of sets of digital instructions each of which sets of digital instructions defines a given stroke written symbol, said computer including means for extracting a selected set of said digital instructions from said memory device and for supplying said selected set of digital instructions to said register means, said digital instructions as they appear in said register means comprising said set of symbol defining signals.

6. A photoexposure system for exposing an artwork on a sheet of photosensitive material as defined in claim 4 further characterized by said signal generator for providing symbol defining signals including means providing a plurality of graphic symbols, and optical sensing means for raster scanning a selected one of said plurality of graphic symbols to produce a beam intensity signal used to control the intensity of the beam of said cathode ray tube which beam intensity signal is one of said set of symbol defining signals.

7. A photoexposure system for exposing an artwork on a sheet of photosensitive material as defined in claim 6 further characterized by said cathode ray tube having X and Y deflection input terminals, and said optical sensing means including a sensing device utilizing a sensing electron beam and also having X and Y deflection input terminals for controlling the deflection of its said beam, a raster generator producing X and Y sweep signals supplied to said X and Y deflection input terminals of said sensing device to cause said beam of said sensing device to scan in a raster fashion, and means coupling said X and Y sweep signals to said X and Y deflection input terminals of said cathode ray tube to cause the beam of said cathode ray tube to move in correspondence with the movement of said beam of said sensing device, said X and Y sweep signals together with said beam intensity signal comprising said set of symbol defining signals.

8. A photoexposure system for exposing an artwork on a sheet of photosensitive material, said system comprising: means for supporting a sheet of photosensitive material, a cathode ray tube having a face and X and Y beam deflection terminals, means for projecting a real image of an object illuminated on said face of said cathode ray tube onto a photosensitive surface, means for moving said real image in two dimensions parallel to the plane of said sheet of photosensitive material to permit said image to be moved along any desired line on said sheet of photosensitive material, a stroke write signal generator for providing symbol defining X and Y signals corresponding to a stroke written symbol on said face and having a given angular orientation relative to said face, means providing an angular orientation signal corresponding to a desired angular orientation of said stroke written symbol on said face, and a resolving means responsive to said symbol defining X and Y signals and to said angular orientation signal for converting said symbol defining X and Y signals into rotated X and Y beam deflection signals which when applied to the X and Y beam deflection terminals of said cathode ray tube cause its beam to stroke write said symbol on said face at said desired angular orientation relative to said face, and means for applying said rotated X and Y beam deflection signals to said X and Y beam deflection terminals.

9. The system defined in claim 8 further characterized by said means for generating a set of symbol defining signals comprising a computer having a memory unit in which memory unit a number of symbol defining signals defining a number of different symbols are stored as digital instructions.

10. The system defined in claim 8 further characterized by said means for generating a set of symbol defining signals comprising a font of graphic symbols, a raster scanning optical sensor for raster scanning a selected one of said graphic symbols, and a raster generator providing X and Y sweep signals for driving said optical sensor, said X and Y sweep signals and the output signal of said optical sensor constituting said symbol defining signals.

11. The system defined in claim 8 further characterized by said set of symbol defining signals including a first signal having a value $(x_1)$ directly related to the X coordinate of the beam of said cathode ray tube at one given instant in generating said symbol at its standard orientation and a second signal having a value $(y_1)$ directly related to the Y coordinate of the beam of said cathode ray tube at the same instant in generating said symbol at its standard orientation, said angular orientation signal having a value $(\theta)$ directly related to the angle at which said symbol is to be rotated from its standard orientation, and said resolving means being an electronic means for generating two output signals $(x_2)$ and $(y_2)$, where $(x_2)$ is the function $(x_1 \cos \theta - y_1 \sin \theta)$ and where $(y_2)$ is the function $(y_1 \cos \theta + x_1 \sin \theta)$.

12. A photoexposure system using a cathode ray tube as an image source, said system comprising means for supporting a sheet of photosensitive material, a cathode ray tube having X and Y beam deflection input terminals, means for generating a set of time varying symbol defining signals commanding deflection of the beam of said cathode ray tube to cause said beam to trace a given luminous symbol on the face of said tube at a given angular orientation relative to said face, means for moving an image of said face of said cathode ray tube in two dimensions parallel to the plane of said sheet of photosensitive material to permit said luminous symbol to expose any selected area of said sheet of photosensitive material, means for generating simultaneously with the generation of said set of symbol defining signals a rotation signal representing a desired angular orientation of said given symbol relative to said face of said tube, a resolver having as inputs thereto said set of symbol defining signals and said rotation signal and operable to produce a set of X and Y symbol generating signals which set of X and Y symbol generating signals when simultaneously applied respectively to said X and Y beam deflection input terminals cause said beam to trace said given luminous symbol on said face of said cathode ray tube at the angular orientation relative thereto dictated by said rotation signal, and means for applying said set of X and Y symbol generating signals respectively to said X and Y beam deflection input terminals.

13. The system defined in claim 8 further characterized by said stroke write signal generator including a $\theta$ register, an X register and a Y register, said signal generator being operable to cause the appearance in said $\theta$ register of a binary word representing said desired angular orientation of said stroke written symbol on said face of said cathode ray tube and also being operable to cause the appearance respectively in said X and Y registers of time varying X and Y binary words which X and Y binary words constitute said symbol defining X and Y signals, said resolving means comprising three digital to analog converters for respectively converting the binary words appearing in said θ, X and Y registers into analog voltage signals, and a resolver for converting said analog voltage signals into two voltage signals constituting said rotated X and Y beam deflection signals.

14. A photoexposure device for exposing lines on a sheet of photosensitive material, said system comprising: means for supporting a sheet of photosensitive material, a cathode ray tube having a face, means providing X and Y beam deflection signals effective when applied to said X and Y deflection terminals to cause the beam of said cathode ray tube to repeatedly trace substantially straight line strokes on said face at a given angular orientation relative thereto, means for projecting a real image of the strokes illuminated on said face onto said sheet of photosensitive material, means for moving said real image in two dimensions parallel to the plane of said sheet of photosensitive material to permit said image to be moved along any desired line on said sheet, means providing a tangent signal representing the instantaneous slope of said line in the plane of said sheet of photosensitive material, and means responsive to said tangent signal for modifying said X and Y beam deflection signals to provide rotated X and Y beam deflection signals which when applied to said X and Y deflection terminals cause the beam of said cathode ray tube to repeatedly trace substantially straight strokes on said face at such an angular orientation relative thereto that in said projected real image said strokes are oriented substantially perpendicular to said line.

15. A line drawing photoexposure device comprising: means for supporting a sheet of material having a photosensitive surface to be exposed, a cathode ray tube having X and Y beam deflection input terminals, means for projecting a real image of the object illuminated on the face of said cathode ray tube onto said photosensitive surface, means for moving said real image along any desired path in the plane of said photosensitive surface, means for deriving a tangent signal related to the instantaneous angular direction of said path relative to said photosensitive surface, means for generating X and Y beam deflection signals which if applied respectively to the X and Y input terminals of said cathode ray tube cause its beam to repeatedly trace as the object illuminated on its face substantially straight line strokes having a length proportional to the width of the line to be exposed on said photosensitive surface and occurring at a fixed angular orientation relative to said face, and means responsive to said tangent signal for modifying said X and Y beam deflection signals to produce modified X and Y beam deflection signals which modified X and Y beam deflection signals when applied respectively to the X and Y input terminals of said cathode ray tube cause its beam to repeatedly trace as the object illuminated on its face substantially straight line strokes having a length proportional to the width of the line to be exposed on said photosensitive surface and so angularly oriented relative to said face that in the real image projected onto said photosensitive surface said strokes are oriented perpendicular to said path, and means for applying said modified X and Y beam deflection signals to said X and Y input terminals of said cathode ray tube.

16. A line drawing photoexposure device as defined in claim 15 further characterized by means for varying the intensity of the beam of said cathode ray tube in accordance with the speed of travel of said real image along said path relative to said photosensitive surface.

* * * * *